United States Patent [19]

Hartzler

[11] 3,966,656

[45] June 29, 1976

[54] AQUEOUS ORGANIC BASE SOLUTION OF POLYHYDRAZIDES

[75] Inventor: Jon David Hartzler, Wilmington, Del.

[73] Assignee: E. I. Du Pont de Nemours and Company, Wilmington, Del.

[22] Filed: Sept. 23, 1974

[21] Appl. No.: 508,654

[52] U.S. Cl. .......................... 260/29.2 N; 260/32.4; 260/32.6 N
[51] Int. Cl.$^2$ .......................... 264 184; C08L 79/06
[58] Field of Search............ 260/29.2 N, 78.4, 32.4, 260/32.6 N; 264/184

[56] References Cited
UNITED STATES PATENTS
3,842,028   7/1972   Dobinson et al............... 260/29.2 N Primary Examiner—Murray Tillman
Assistant Examiner—J. Ziegler

[57] ABSTRACT

This invention relates to novel film- and fiber-forming polyhydrazide solutions (dopes) which are prepared in a solvent system comprising aqueous organic bases. Some dopes of this invention are optically anisotropic.

8 Claims, 1 Drawing Figure

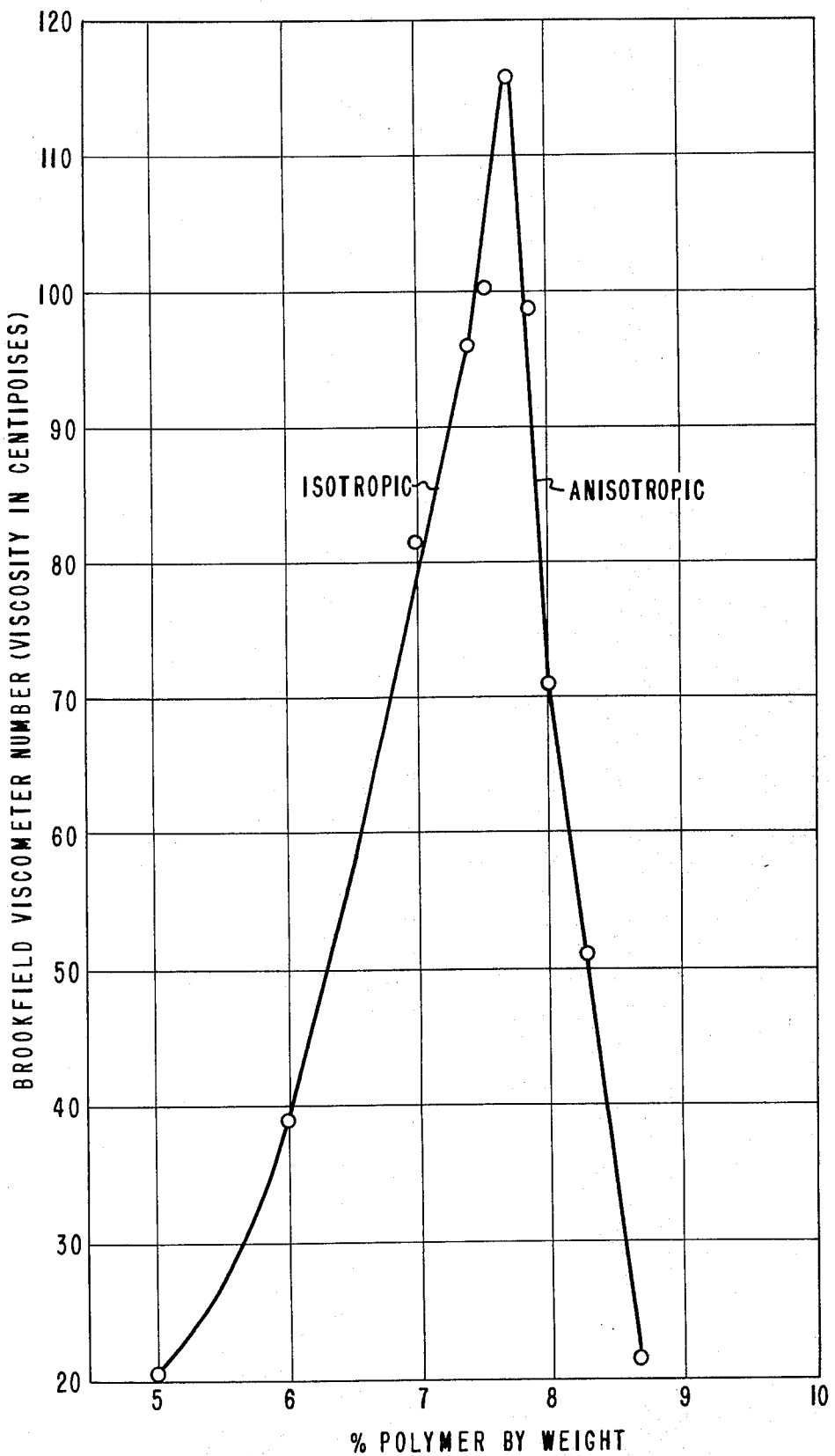

AQUEOUS ORGANIC BASE SOLUTION OF POLYHYDRAZIDES

BACKGROUND OF THE INVENTION

Film- and fiber-forming solutions of polyhydrazides are known in the art, e.g., as described in Frazer U.S. Pat. No. 3,130,182, U.S. Pat. No. 3,130,183, U.S. Pat. No. 3,536,651 and in Schopf et al. U.S. Pat. No. 3,607,810. Optically anisotropic solutions of aromatic polyamides are described in, e.g., Kwolek U.S. Pat. No. 3,671,542.

SUMMARY OF THE INVENTION

This invention provides novel film- and/or fiber-forming solutions comprising polyhydrazides and copolyhydrazides in aqueous solutions of organic bases selected from the group of tetramethylammonium hydroxide, tertiary butylamine, methylbutylamine, pyrrolidine, triethylamine, tetrapropylammonium hydroxide, tetraethylammonium hydroxide, diethylamine and piperidine. The (co)polyhydrazides are characterized by substantially equimolar amounts of repeating structural units of the formulae

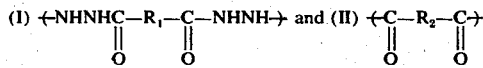

wherein $R_1$ and $R_2$ represent divalent radicals individually selected from the group of organic radicals of from 1 to 12 carbon atoms; 2,5-pyridinediyl radicals, or a chemical bond. Some of these solutions are optically anisotropic. Useful (co)polyhydrazides exhibit inherent viscosities of at least about 0.2, measured as described hereinafter. The preferred solution is formed from poly(terephthalic hydrazide) and tetramethylammonium hydroxide.

The low solubility of poly(terephthalic hydrazide) is noted in Frazer U.S. Pat. No. 3,536,651 wherein solutions of poly(terephthalic hydrazide) are obtained by dissolving the polymer in mixtures of dimethyl sulfoxide (DMSO) and LiCl. The present optically anisotropic solutions permit the preparation of, e.g., fibers which exhibit higher levels of tensile properties (e.g., tenacity) than do the fibers spun from the solutions described in U.S. Pat. No. 3,536,651.

DESCRIPTION OF THE PREFERRED EMBODIMENTS

Useful Polyhydrazides And Copolyhydrazides

The polymers useful for preparing these novel solutions, both isotropic and anisotropic, may be prepared by the low temperature solution polymerization process described in Frazer U.S. Pat. No. 3,130,182, U.S. Pat. No. 3,130,183, and U.S. Pat. No. 3,536,651. In this process, at least one hydrazine or dihydrazide is caused to react with a dicarboxylic acid halide (preferably a diacid chloride) in a solvent system at low temperatures. Useful copolyhydrazides may process both random and ordered structures.

Dicarboxylic acid chlorides and dihydrazides from which the polyhydrazides and copolyhydrazides useful in this invention may be prepared include those of oxalic acid, isophthalic acid, terephthalic acid, chloroterephthalic acid, 4,4'-bibenzoic acid, 2,5-dihydroterephthalic acid, pyridine-2,5-, 2,6-, and 3,5-dicarboxylic acids, and derivatives thereof wherein the aromatic nuclei may bear substituents such as lower alkyl groups (i.e., 1–4 carbon atoms), halogen atoms, and other nonreactive substituents. Examples of such derivatives are 4-fluoroisophthaloyl chloride, 5-chloroisophthaloyl chloride, 4,6-dichloroisophthaloyl chloride, 4-bromoisophthaloyl chloride, 5-tertiary butylisophthaloyl chloride, 2-methylisophthaloyl chloride, 4,6-dimethylisophthaloyl chloride, 4-methoxyisophthaloyl chloride, 5-methoxyisophthaloyl chloride, 2,4-dimethoxyisophthaloyl chloride, and the related terephthaloyl chloride derivatives. By "nonreactive substituents" is meant a grouping of atom(s) which will not react appreciably with either carboxylic hydrazides or carbonyl chlorides under the polymerization conditions. Other useful reactants include the dihydrazides prepared from malonyl, succinyl, glutaryl, fumaryl, methylfumaryl, dimethylfumaryl, 1,3-cyclohexanedicarbonyl, and 1,4-cyclohexanedicarbonyl esters. Random copolymers may be prepared by the procedures described in, e.g., Frazer U.S. Pat. No. 3,130,182.

Among the preferred polyhydrazides and copolyhydrazides which are useful in preparing the solutions of the present invention may be named poly(terephthalic hydrazide), poly(terephthalic/2,5-pyridinediyl hydrazide), poly(terephthalic/chloroterephthalic hydrazide), poly(terephthalic/oxalic hydrazide) and poly(terephthalic/isophthalic hydrazide).

Solution Preparation

The novel solutions of this invention may be prepared by combining, at room temperature and preferably with stirring, a quantity of polyhydrazide or copolyhydrazide described above with a solvent selected from these organic bases in aqueous solution: tetramethylammonium hydroxide, tetraethylammonium hydroxide, diethylamine, piperidine, tertiary butylamine, methylbutylamine, pyrrolidine, triethylamine, and tetrapropylammonium hydroxide. Stable solutions are formed and may be prepared in concentration ranges suitable for the preparation of shaped articles. These solutions are prepared from (co)polymers which exhibit inherent viscosities of at least about 0.2, preferably of about 1 to 8.0, measured as described herein.

The preferred solutions are prepared with tetramethyl- or tetraethylammonium hydroxides. Solutions of the former are especially preferred because they exhibit high solvent power and are capable of retaining anisotropic character at elevated temperatures, thus permitting greater flexibility in the preparation of shaped articles. For example, a 25.5% solids solution of poly(terephthalic hydrazide), $\eta$inh = 4.7, in 20% aqueous tetramethylammonium hydroxide loses anisotropy and becomes isotropic at a transition temperature range of 76°–82°C.; the transition temperature for an 11.6% solids solution (polymer $\eta$inh = 4.6) in 10% aqueous tetramethylammonium hydroxide occurs at 50°–55°C. A 9.1% solids dope in 10% aqueous tetraethylammonium hydroxide becomes isotropic at 30°–36°C.

Polyhydrazides and copolyhydrazide solutions within the scope of this invention have been demonstrated for these aqueous bases as follows:

| Aqueous Solvent | Solvent Strength | % Solids In Dope | Type of Dope |
| --- | --- | --- | --- |
| tertiary butylamine | 5% | 4–5 | Isotropic |
| pyrrolidine | 15% | 4–5 | Isotropic |
| methylbutylamine | 5–15% | 4–5 | Isotropic |
| triethylamine | 5–15% | 4–5 | Isotropic |
| tetrapropylammonium hydroxide | 10% | 9–10 | Isotropic |
| diethylamine | 10–15% | 9–10 | Anisotropic |
| piperidine | 10% | 9–10 | Anisotropic |
| tetraethylammonium hydroxide | 2–7% | 5–7 | Isotropic |
|  | 8–10% | 7–10 | Anisotropic |
| tetramethylammonium hydroxide | 2–30% | 5–28% | Anisotropic |
|  |  | up to 35% | Isotropic |

Anistropic Solutions

Certain solutions of this invention are optically anisotropic, i.e., microscopic regions of a given solution are birefringent; a bulk solution sample depolarizes plane-polarized light because the light transmission properties of the microscopic areas of the solution vary with direction. This characteristic is associated with the existence of at least part of the solution in the liquid crystalline or mesomorphic state.

The solutions which exhibit optical anisotropy do so while the solution is in the relaxed state. This is in contrast to conventional polymeric solutions which may depolarize plane-polarized light when subjected to appreciable shear.

It is to be understood that only certain of the combinations of ingredients which provide the solutions of this invention result in the formation of anisotropic solutions. There is a complex relationship existing among, e.g., the polymer or copolymer species, its concentration, the inherent viscosity thereof, the solvent system, and the solution temperature which determines whether a given solution will be anisotropic or isotropic. A useful polymer concentration-solution viscosity relationship exists for given polymer-solvent combinations which are capable of forming the anisotropic solutions. For such combinations, the solution formed is isotropic when the polymer concentration is below a particular level. As the concentration of the polymer is increased, the viscosity of the solution increases. However, at a point referred to herein in as the "critical concentration point" there is a sharp discontinuity in the slope of the viscosity v. concentration curve when the solution changes from isotropic to partially anisotropic without the formation of a solid phase. Further addition of polymer results in a decrease in the viscosity of the solution as it becomes more anisotropic. An exemplary viscosity v. concentration curve is illustrated in the Figure. This curve is the critical concentration curve for poly(terephthalic hydrazide) of inherent viscosity 4.4 in an aqueous tetramethylammonium hydroxide solution at 27°C. at 10.4% base concentration. The "critical concentration point" (as well as the complete viscosity v. concentration curve) is routinely determined using conventional concentration and viscosity measuring techniques. For example, a polymer solution may be placed in a suitable vessel equipped with a polytetrafluoroethylene cap through which a viscometer spindle extends into the solution with constant temperature being maintained. The viscosity of the stirred solution may be conventionally measured with a viscometer (e.g., a Brookfield Synchro-Lectric Viscometer, Model RV, product of the Brookfield Engineering Laboratories, Inc., Staughton, Mass., or equivalent). Viscosity measurements are made at the initial polymer concentration and at higher concentrations (i.e., after an additional known amount of polymer is added). By this technique (or equivalent) a viscosity v. concentration curve may be plotted for this system (the given polymer and liquid medium at that temperature) and the critical concentration point (i.e., the discontinuity in the slope of the curve) is determined.

A qualitative determination of optical anisotropy in these dopes can be conveniently made using a light source, analyzer, and crossed polarizer (or equivalents thereof). Commercially available polarizing microscopes are useful for the qualitative determination of the optical anisotropy.

Another qualitative determination of the anisotropic character of these solutions may be made with the naked eye. These solutions may appear turbid or hazy and yet contain no, or practically no undissolved solid. When the solution, seen under reflected ordinary light, is disturbed by shaking or rolling the vessel containing the solution, or by only slow stirring, there is produced a characteristic, readily observed, satin-like sheen or glow which is observed even after the disturbance ceases, and which decreases in intensity thereafter. This may be described as being a pearly or opalescent quality of the solution. Solutions which are disturbed as described above often give the appearance of having striations and/or graininess in the surface. These visual effects are observed in the anisotropic solutions of this invention; this may commonly be referred to as "stir opalescence". Further details on qualitative and quantitive determinations of optical anisotropy are presented in U.S. Pat. No. 3,671,542 which describes the improved properties (e.g. higher tenacity and initial modulus) of fibers spun from anisotropic, rather than isotropic systems.

These optically anisotropic aqueous solutions are obtained only within certain limits, e.g., of (co)polymer species, inherent viscosities, solvent composition, and solids concentration and temperature. For example, anisotropic solutions containing about 7.5–9% by weight poly(terephthalic hydrazide) are obtained in about 10% (wt.) solutions of piperidine and in 10–15% (wt.) solutions of diethylamine. Other anisotropic solutions comprise 7.5–10% (wt.) solutions of tetraethylammonium hydroxide containing about 7.5–9.1% (wt.) poly(terephthalic hydrazide). The singularly preferred anisotropic solutions of the present invention are prepared with 10–20% (wt.) tetramethylammonium hydroxide solutions containing from about 8–30% (wt.) poly(terephthalic hydrazide). In these anisotropic solutions the polyhydrazides exhibit inherent viscosities within the range of about 1.5 to 8.0.

Shaped Article Preparation

The above-described solutions may be formed into shaped articles, e.g., films, fibers, and fibrids. Useful films, both transparent and translucent, may be cast, using a variety of quenching media. While film quality is generally independent of dope temperature, nature of the quenching media, and temperature of the quenching media, the polyhydrazide content of the casting dopes is an important factor which affects film quality. For example, good films are obtained by casting 9.1% solids dopes of poly(terephthalic hydrazide) in 10% aqueous tetraethylammonium hydroxide into dilute acidic baths. This is true, also, when similar dopes are cast from tetramethylammonium hydroxide solutions. However, with high solids dopes in the latter solvent, very dilute acids or nonaqueous alcoholic-hydrogen chloride baths are needed. Fibers of good quality may be prepared from these dopes by wet spinning them into suitable baths. Fibrids, useful for paper preparation, may be prepared by the procedures described in Morgan U.S. Pat. No. 2,999,788, using a suitable coagulant.

The coagulation of these solutions to form shaped articles is best accomplished by the use of acidic coagulating baths. Dilute solutions (0.5–1. 0N) of phosphoric and acetic acids are excellent coagulating media for filament formation. These baths are useful for film coagulation, also, together with baths of methanol/hydrochloric acid (10/1, V/V), 2B alcohol/hydrochloric acid (10/1, V/V), 2B alcohol/sulfuric acid (95/5, V/V), and others. When fibers are being prepared from the solutions it is preferred that the temperature of the coagulating bath be about 10°C. or less, since baths of low temperature have been found to favor the formation of filaments characterized by higher tenacity.

After being formed, the fibers may be treated with a finish composition and wound up on bobbins. Residual solvent and/or acidic coagulating media may be removed by soaking the bobbins, e.g., in water after which the fibers are dried. Excess solvent and coagulating media may also be removed by passing the fiber through aqueous baths prior to the windup operation, by flushing the bobbins with water during windup, etc.

It will be understood that the usual additives such as dyes, fillers, antioxidants, etc. can be incorporated into the dopes of this invention for the purposes intended, prior to shaped article preparation.

MEASUREMENTS AND TESTS

Inherent Viscosity: Inherent viscosity ($\eta$inh) is defined by the following equation:

$$\eta\text{inh} = \frac{\ln(\eta\text{rel})}{C}$$

wherein ($\eta$rel) represents the relative viscosity and C represents a concentration of 0.5 gram of the polymer in 100 ml. of solvent. The relative viscosity ($\eta$rel) is determined by dividing the flow time in a capillary viscometer of a dilute solution of the polymer by the flow time for the pure solvent. The dilute solutions used herein for determining ($\eta$rel) are of the concentration expressed by (C), above; flow times are determined at 30°C., using 5% aqueous solutions of diethylamine (Method 1), dimethylsulfoxide containing 5% lithium chloride (Method 2), 100% sulfuric acid (used at 25°C., Method 3) or mcresol (Method 4). For purposes of determining inherent viscosity as designated by the claims, one uses any of the foregoing solvents in which the polymer is soluble at the 0.5% level providing that there is no undue polymer degradation as evidenced by a sharp drop in inherent viscosity in a short period of time, such as 30 minutes.

Fiber Tensile Properties: Fiber properties of tenacity, elongation, and initial modulus are coded as T/E/Mi and are reported in their conventional units, i.e., grams per denier, percent, and grams per denier. Denier is coded as Den. Such properties are conveniently measured in accordance with ASTM operational specifications, D76-53, (October 1962), utilizing a testing machine, e.g., an Instron tester (product of the Instron Engineering Corp., Canton, Mass.), providing a constant rate of extension.

Optical Anisotropy: Optical Anisotropy may be measured by the procedures described in Kwolek U.S. Pat. No. 3,671,542.

EXAMPLE 1

This example illustrates the preparation of poly(-terephthalic hydrazide) fibers from an optically anisotropic dope of the polymer in 10% aqueous tetraethylammonium hydroxide.

Polymer Preparation

Terephthalic dihydrazide (19.4 g., 0.10 mole) and lithium chloride (16.82 g.) are suspended, under nitrogen, in an ice-cooled mixture of N,N-dimethylacetamide (DMAc, 600 ml.) and N-methylpyrrolidone-2 (NMP, 150 ml.) in a liter resin kettle equipped with a stirrer and nitrogen ports; the suspension is stirred for 60 minutes. Terephthaloyl chloride (20.30 g., 0.1 mole) is added, with stirring, in four portions over 30 minutes. The stirrer is removed and the reaction mixture allowed to stand at autogenous temperature for four days. The opaque gelatinous reaction mixture is combined with water to precipitate the product which is washed in a blender with water (5X) and with acetone (1X). The washed product is dried in air overnight, then in a vacuum oven at 100°C. There is obtained 31.9 g. of poly(terephthalic hydrazide), $\eta$inh = 4.7 (Method 1).

Dope and Fiber Preparation

An optically anisotropic spin dope containing 9.1% solids is prepared by combining 10 g. of the above-prepared polymer with 100 ml. of a 10% aqueous solution of tetraethylammonium hydroxide. After being centrifuged to remove a few undissolved particles, the dope (density = 1.030 g./cm$^3$ at 25°C.) is extruded through a 60-hole spinneret [each hole of 0.005 cm. diameter] into a coagulation bath (25 in. long) comprising a mixture of 368 ml. of orthophosphoric acid and 2 liters of water, maintained at 7°C. The emerging filaments are washed on the run and are wound up at 35.7 m./min.; SSF = 2.9. The fibers are soaked overnight in distilled water on the bobbin and are dried in air. The dried filaments exhibit T/E/Mi/Den. = 10.7/7.5/320/0.75.

EXAMPLE 2

This example illustrates the preparation of poly(-terephthalic hydrazide) fibers from an optically anisotropic dope of the polymer in 16.7% aqueous tetramethylammonium hydroxide.

Dope and Fiber Preparation

An optically anisotropic spin dope containing 10% solids is prepared by combining 10.8 g. of poly(terephthalic hydrazide), ηinh = 4.6 (Method 1) with a 16.7% aqueous solution of tetramethylammonium hydroxide prepared by combining 30 ml. of water with 60 ml. of 25% tetramethylammonium hydroxide. The dope is extruded at room temperature through a spinneret as described in Example 1 into a coagulation bath (24 in. long) comprising a mixture of 184 ml. of orthophosphoric acid and 4 l. of water, maintained at 8°C. The emerging filaments are washed on the run and are wound up as in Example 1; SSF = 3.2. The fibers are washed and dried as in Example 1. The dried filaments exhibit T/E/Mi/Den. = 7.9/11.2/206/1.7; O.A. = 30°.

EXAMPLE 3

This example illustrates poly(terephthalic hydrazide) fibers prepared from an optically anisotropic dope of the polymer in 10% aqueous tetraethylammonium hydroxide. Heat-treated fibers exhibit a desirable combination tensile properties: high tenacity and modulus, and moderate elongation.

Dope Preparation

An isotropic dope of poly(terephthalic hydrazide), ηinh = 5.1 (Method 1) is formed in 10% aqueous tetraethylammonium hydroxide at 5.7% by weight polymer. An anisotropic dope is formed at 7.1% by weight polymer.

Dope and Fiber Preparation

An optically anisotropic spin dope containing 9.1% solids is prepared from the above-described polymer by the method shown in Example 1. This dope is extruded through a 40-hole spinneret [each hole of 0.008 cm. diameter] into a coagulation bath (26 inches long, maintained at 10°C.) comprising a mixture of 184 ml. of orthophosphoric acid, 4 l. of water, and ice. The emerging filaments are washed on the run and are wound up at 20.1 m./min.; SSF = 2.6. The fibers are soaked over the weekend in distilled water on the bobbin and dried in air. The dried filaments exhibit T/E/Mi/Den. = 10.5/13.7/220/2.04.

Yarn from the above fiber is heat treated by being drawn 1.1X over a slotted bar (13.5 inches contact distance) maintained at 200°C.; input speed is 6.1 m./min. The treated fiber exhibits these filament properties: T/E/Mi/Den. = 12.7/7.4/363/1.96.

EXAMPLE 4

The example illustrates the preparation of ordered copoly(chloroterephthalic/terephthalic hydrazide) (1/1) and an anisotropic dope thereof in 25% aqueous tetramethylammonium hydroxide.

A cooled solution (solid carbon dioxide bath) of chloroterephthalic dihydrazide (2.28 g., 0.01 mole) in DMac (18 ml.) containing 5% lithium chloride, is prepared in a 50 ml. Erlenmeyer flask. To this stirred solution (magnetic stirrer) is added, with cooling, terephthaloyl chloride (2.03 g., 0.01 mole) in 4 portions (10 minutes apart). Lithium carbonate (0.74 g.) is added to the stirred reaction mixture 1 hr. later, after the mixture has been allowed to warm to room temperature. The reaction mixture is stirred for another 71 hr. to form a clear, viscous solution. The latter is combined with water to precipitate the polymer which is collected, washed separately with water and with 2B alcohol, and dried in a vacuum oven at 80°C. There is obtained 3.21 g. of product, ηinh = 0.73 (Method 2), having the repeating structural unit

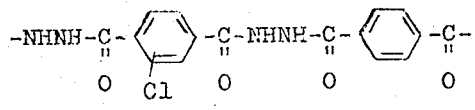

A 28% solids dope of this polymer in 25% aqueous tetramethylammonium hydroxide is optically anisotropic.

EXAMPLE 5

Illustrated in the example is the random copolyhydrazide prepared from terephthalic dihydrazide and terephthaloyl chloride/2,5-pyridinedicarbonyl chloride (50/50), and an anisotropic dope thereof in 25% aqueous tetramethylammonium hydroxide.

An ice-cooled solution of terephthalic dihydrazide (1.94 g., 0.01 mole) in a mixture of HMPA (9 ml.) and NMP (9 ml.) is prepared and stirred as in Example 4. To this solution are added, with cooling, 2,5-pyridinedicarbonyl chloride (1.02 g., 0.005 mole) and terephthaloyl chloride (1.015 g., 0.005 mole). Lithium carbonate (0.74 g.) is added 1 hour later. The stirred reaction mixture is allowed to warm to room temperature in the next hour. After 14 hr. more, the cloudy viscous reaction mixture is worked up as in Example 4 (methanol replaces the 2B alcohol) to yield 2.99 g. of copolymeric product, ηinh = 0.43 (Method 2), comprising the repeating structural units

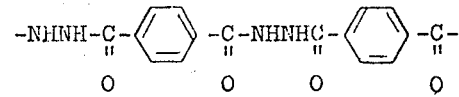

and

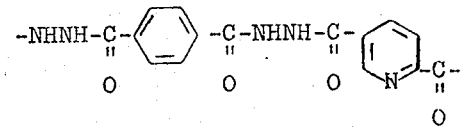

in a 50/50 molar ratio.

A 27% solids dope of this copolymer in 25% aqueous tetramethylammonium hydroxide is optically anisotropic.

EXAMPLE 6

Illustrated in this example is the random copolyhydrazide prepared from oxalic dihydrazide, terephthalic dihydrazide, chloroterephthaloyl chloride and 2,5-pyridinedicarbonyl chloride (each reactant used in an equimolar amount), and an anisotropic dope thereof in 25% aqueous tetramethylammonium hydroxide.

An ice-cooled solution of terephthalic dihydrazide (0.97 g., 0.005 mole) and oxalic dihydrazide (0.59 g.; 0.005 mole) in a mixture of HMPA (9 ml.) and NMP (9 ml.) is prepared and stirred as in Example 4. To this solution are added, with cooling, chloroterephthaloyl chloride (1.18 g., 0.005 mole) and 2,5-pyridinedicarbonyl chloride (1.02 g.; 0.005 mole). The procedure of Example 5 is then followed to yield 2.85 g. of product, ηinh = 0.82 (Method 2), comprising these repeating structural units arranged as a random copolyhydrazide:

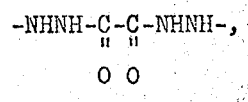

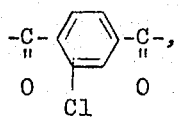

and

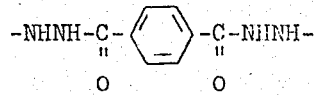

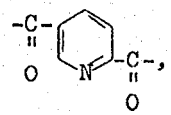

A 28% solids dope of this copolymer in 25% aqueous tetramethylammonium hydroxide is optically anisotropic.

EXAMPLE 7

Illustrated in this example is the random copolyhydrazide prepared from oxalic dihydrazide and chloroterephthaloyl chloride/terephthaloyl chloride (20/80), and an anisotropic dope thereof in 25% aqueous tetramethylammonium hydroxide.

An ice-cooled solution of oxalic dihydrazide (1.18 g., 0.01 mole) is prepared as in Example 4. To this are added chloroterephthaloyl chloride (0.474 g., 0.002 mole) and terephthaloyl chloride (1.624 g., 0.008 mole) to form, in 30 minutes, a difficultly stirrable paste. After another 30 min., lithium carbonate is added to the reaction mixture (now at room temperature) as in Example 5. The reaction mixture is stirred manually, then allowed to stand at room temperature for about 15 hr. It is then worked up as in Example 5 to yield 2.45 g. of copolymeric product, ηinh = 1.10 (Method 1), comprising these respective repeating structural units in a 20/80 molar ratio:

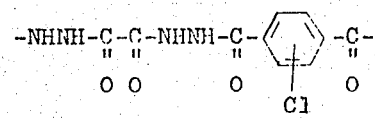

and

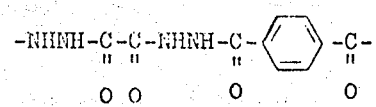

A 20% solids dope of this copolymer in 25% tetramethylammonium hydroxide is optically anisotropic.

EXAMPLE 8

This example illustrates preparation of poly[(1-methylhydrazo)terephthaloyl(2-methylhydrazo)-terephthaloyl] and an isotropic dope thereof in tetramethylammonium hydroxide.

In a 2000 ml. round bottom single necked flask are placed dimethylterephthalate (200 g.), benzene (600 ml.), and methylhydrazine (92.1 g.). The reaction mixture is refluxed on a steam bath for 64 hr., then cooled to precipitate the product. Methanol (500 ml.) is added to the cool reaction mixture, which is then filtered. The isolated product is washed with sodium carbonate solution, then with water, and is dried. There is obtained terephthalic acid bis(2-methylhydrazide), (A), 50 g., m.p. = 240°–241°C., of the formula

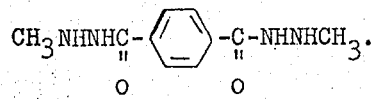

An ice-cooled solution of A (2.22 g., 0.01 mole) in a mixture of HMPA (10 ml.) and NMP (7 ml.) is prepared and stirred as in Example 4. To this solution is added, portionwise and with cooling, terephthaloyl chloride (2.03 g., 0.01 mole). Lithium carbonate (0.74 g.) is added in 15 min. A difficultly stirrable precipitate forms in another 15 min. The reaction mixture is allowed to warm to room temperature in another 90 minutes. The cloudy, viscous mass which forms is permitted to stand at room temperature for another 14 hr. before being worked up as in Example 5 to yield 2.88 g. of the above-named polyhydrazide, ηinh = 0.49 (DMAc.5% LiCl) of the repeating structural unit

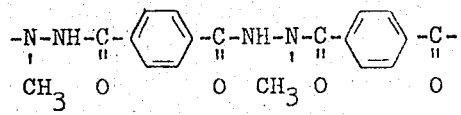

A 29% solids dope in 10% tetramethylammonium hydroxide is isotropic.

EXAMPLE 9

This example illustrates preparation of poly(p-phenylenediacetic/terephthalic dihydrazide) (1/1) and an isotropic dope thereof in tetraethylammonium hydroxide.

A mixture of dimethyl-p-phenylenediacetate (29.9 g.), 85% hydrazinehydrate (32 ml.), and benzene (200 ml.) is heated at reflux on a steam bath for 8 hr. Only 7.1 g. (A) of solid precipitated, indicating incomplete reaction. The benzene fraction is concentrated on a rotor-evaporator, then added to 200 ml. benzene and 30 ml. of 85% hydrazine hydrate. After being heated at reflux for 27 hr., 15 g. (B) of solid separates. Hydrazine hydrate (25 ml.) is again added to the benzene fraction. After 16 hr. at reflux, another 7.0 g. (C) of solid precipitates. The solid fractions are recrystallized from water to give 18.5 g. (61.8%) of the dihydrazide of p-phenylenediacetic acid with the following melting points: A+B = 233°–236°C.; C = 234°–237.5°C. The IR spectrum has bands at 1625 cm$^{-1}$ (hydrazide carbonyl)

and 3295, 3330 cm$^{-1}$ (NH). Anal.: Calcd. for $C_{10}H_{14}N_4O_2$: C, 54.04; H, 6.35. Found: C, 53.82; H, 6.44.

In a mixture of DMAc (100 ml.) and NMP (100 ml.) in a 500 ml. resin kettle equipped with a stirrer and nitrogen inlet port are suspended p-phenylenediacetic acid dihydrazide (5.6 g., 0.025 mole) and lithium chloride (4.24 g.). Most of the solids dissolve after being stirred for 30 min. The resulting solution is cooled for 10 min. in an ice/water bath, after which terephthaloyl chloride (5.08 g., 0.025 mole) is added in three portions at 5 min. intervals. The resulting solution is permitted to stand for 90 min., after which it is combined with water to precipitate the product which is collected, washed in a blender with water (3X) and with acetone (2X), and dried at 110°C. in a vacuum oven. There is obtained 7.5 g. of product, $\eta$inh = 0.66 (Method 2).

A 9.1% solids dope of this polyhydrazide in 10% aqueous tetraethylammonium hydroxide is isotropic.

EXAMPLE 10

In the following Table I are described optically *anisotropic* dopes of other polyhydrazides and copolyhydrazides prepared by synthesis procedures equivalent to or similar to those described in Examples 4–7. For each dope in the table are shown the repeating units (for copolymers, ratio shown parenthetically), inherent viscosity, and amount of solids for the (co)polymers, plus the particular aqueous solvent and concentration thereof; dopes are prepared at room temperature. The (co)polymers described in this Table are prepared from oxalic dihydrazide, terephthalic dihydrazide, chloroterephthalic dihydrazide, 2,5-pyridinedicarboxylic acid dihydrazide, terephthaloyl chloride, chloroterephthaloyl chloride, and 2,5-pyridinedicarbonyl chloride.

TABLE I - ANISOTROPIC DOPES

| | (CO)POLYMER IN DOPE | | | | DOPE SOLVENT | |
|---|---|---|---|---|---|---|
| ITEM | DIHYDRAZIDE UNIT(S) | ACID CHLORIDE UNIT(S) | $\eta$inh* | % Solids | Solvent | Solvent Conc.,wt.% |
| 1 | -NHNH-C(C₆H₄)C-NHNH- ("Q") | pyridine-2,5-dicarbonyl | 0.70 (3) | 20 | B | 25 |
| 2 | -NHNH-C(C₆H₄)C-NHNH- ("Q") | terephthaloyl / chloroterephthaloyl (9/1) | 0.88 | 20 | A | 25 |
| 3 | -NHNH-C(C₆H₄)C-NHNH- ("Q") | terephthaloyl / chloroterephthaloyl (8/2) | 0.39 | 20 | A | 25 |
| 4 | -NHNH-C(C₆H₄)C-NHNH- ("Q") | terephthaloyl / chloroterephthaloyl (5/5) | 0.43 | 20 | A | 25 |
| 5 | -NHNH-C(C₆H₄)C-NHNH- ("Q") | terephthaloyl / pyridine-2,5-dicarbonyl (9/1) | 0.17 | 20 | A | 25 |
| 6 | -NHNH-C(C₆H₄)C-NHNH- ("Q") | terephthaloyl / pyridine-2,5-dicarbonyl (8/2) | 0.64 | 20 | A | 25 |
| 7 | -NHNHC(C₆H₃Cl)C-NHNH- | chloroterephthaloyl | 0.77 | 28 | A | 25 |
| 8 | -NHNHC(C₆H₃Cl)C-NHNH- | pyridine-2,5-dicarbonyl | 1.43 | 29** | A | 25 |

TABLE I - ANISOTROPIC DOPES-continued

| | (CO)POLYMER IN DOPE | | | | DOPE SOLVENT | |
|---|---|---|---|---|---|---|
| ITEM | DIHYDRAZIDE UNIT(S) | ACID CHLORIDE UNIT(S) | ηinh* | % Solids | Solvent | Solvent Conc.,wt.% |
| 9 | —NHNH—C(=O)—C(=O)—NHNH— ("P") | -C(=O)-C₆H₄-C(=O)- | 0.24 (3) | 33 | A | 25 |
| 10 | —NHNH—C(=O)—C(=O)—NHNH— | -C(=O)-C₆H₃(Cl)-C(=O)- | 2.06 | 20 | A | 25 |
| 11 | —NHNH—C(=O)—C(=O)—NHNH— | -C(=O)-C₆H₃(Cl)-C(=O)-/-C(=O)-C₆H₄-C(=O)- (1/9) | 0.92 (1) | 20 | A | 25 |
| 12 | "Q"/"P" (95/5) | -C(=O)-C₆H₄-C(=O)- | 5.58 | 9.1 | B | 25 |
| 13 | "Q" | -C(=O)-C₆H₄-C(=O)- | 4.72 | 10 | A | 15 |
| 14 | -NHNH-C(=O)-(pyridyl)-C(=O)-NHNH- | -C(=O)-C₆H₄-C(=O)- | 1.74 (1) | 18 | A | 25 |
| 15 | "P" | -C(=O)-C₆H₄-C(=O)-/-C(=O)-(pyridyl)-C(=O)- (9/1) | 1.03 (1) | 33*** | A | 25 |

A. Tetramethylammonium hydroxide
B. Tetraethylammonium hydroxide
*Measured by Method 2 unless otherwise indicated parenthetically
**Isotropic at 50°C., anisotropic when cooled to 30°C.
***Anisotropic at 20–25°C.

EXAMPLE 11

In the following Table II are described optically isotropic dopes of (co)polyhydrazides prepared as described in Example 10, with the addition that oxalyl chloride, 5-tertiary butylisophthaloyl chloride, isophthalic dihydrazide, and the bis(2-methyl)hydrazide of terephthalic acid are comonomers for some species. In each of these isotropic dopes the solvent is aqueous tetramethylammonium hydroxide of the concentration indicated in the Table.

TABLE II - ISOTROPIC DOPES

| | (CO)POLYMERS IN DOPE | |
|---|---|---|
| ITEM | DIHYDRAZIDE UNIT(S) | ACID CHLORIDE UNIT(S) |
| 1 | -NHNH-C(=O)-C₆H₃(Cl)-C(=O)-NHNH- | -C(=O)-C₆H₄-C(=O)-/-C(=O)-C₆H₃(Cl)-C(=O)- (1/1) |

TABLE II - ISOTROPIC DOPES-continued (CO)POLYMERS IN DOPE

| ITEM | DIHYDRAZIDE UNIT(S) | ACID CHLORIDE UNIT(S) |
|------|---------------------|------------------------|

TABLE II - ISOTROPIC DOPES-continued

| ITEM | DIHYDRAZIDE UNIT(S) | ACID CHLORIDE UNIT(S) |
|---|---|---|
| 13 | —NHNH—C—(phenyl)—C—NHNH— (with C=O groups) | —C—(phenyl, t-Butyl substituent)—C— (with C=O) |
| 14 | —N(CH₃)—NH—C—(phenyl)—C—NH—N(CH₃)— | —C—(phenyl)—C— |
| 15 | —N(CH₃)—NH—C—(phenyl)—C—NH—N(CH₃)— | —C—(phenyl, Cl substituent)—C— |
| 16 | —N(CH₃)—NH—C—(phenyl)—C—NH—N(CH₃)— | —C—(pyridyl)—C— |

| | (CO)POLYMERS IN DOPE | | DOPE SOLVENT |
|---|---|---|---|
| ITEM | ηinh* | % Solids | Concentration Wt. %, Tetramethylammonium Hydroxide |
| 1 | 1.21** | 35 | 15 |
| 2 | Insol. | 29 | 25 |
| 3 | 1.03$^{(1)}$ | 30 | 25 |
| | | 20 | 15 |
| | | 25 | 25 |
| 4 | 0.72$^{(1)}$ | 20 | 15 |
| 5 | Insol. | 20 | 15 |
| 6 | 0.56$^{(1)}$ | 20 | 15 |
| 7 | 0.31 | 33 | 25 |
| | | 25 | 25 |
| 8 | 0.49 $^{(3)}$ | 20 | 15 |
| 9 | 0.41 $^{(1)}$ | 20 | 15 |
| 10 | 0.82 | 20*** | 15 |
| 11 | 1.09 | 10 | 25 |
| 12 | 0.76 | 20 | 15 |
| | 0.76 | 25 | 15 |
| | 0.76 | 20 | 10 |
| 13 | 0.51 $^{(4)}$ | 33 | 25 |
| 14 | 0.38 | 25 | 15 |
| | | 29 | 25 |
| 15 | 0.37 | 25 | 15 |
| 16 | 0.28 | 25 | 15 |

*Measured by Method 2 unless otherwise indicated parenthetically
**Optically anisotropic at 33% solids in 25% tetramethylammonium hydroxide at 25°C., preferably 20°C. to 10°C.; isotropic at 30°C. to 50°C.
***Optically isotropic at 60°C.

EXAMPLE 12

Illustrated in the following Table III is the preparation of dopes, both isotropic and anisotropic, of poly(terephthalic hydrazide) in aqueous organic bases. The polymer is prepared by procedures equivalent to or similar to those described in Examples 1–3. Inherent viscosities are measured by Method (1) unless otherwise indicated.

| Code | Solvent (Aqueous) |
|---|---|
| A | tetramethylammonium hydroxide |
| B | tetraethylammonium hydroxide |
| C | diethylamine |
| D | piperidine |
| E | tertiary butylamine |
| F | methylbutylamine |
| G | pyrrolidine |
| H | triethylamine |
| I | tetrapropylammonium hydroxide |

TABLE III

Dopes of Poly(Terephthalic Hydrazide)

| | Polymer in Dope | | Aqueous | Solvent | |
|---|---|---|---|---|---|
| Item | Wt.% | ηinh | Solvent | Conc. Wt.% | Dope Type |
| 1 | 15.5 | 5.11 | A | 10 | Anisotropic |
| 2 | 18.7 | 4.4 | A | 10 | " |
| 3 | 24.7 | 4.4 | A | 20 | " |
| 4 | 21 | 4.4 | A | 16.7 | " |
| 5 | 27 | 4.4 | A | 20 | " |
| 6 | 7.5 | 3.8 | B | 7.5 | " |
| 7 | 7.5 | 3.8 | B | 10 | " |
| 8 | 9.1 | 3.8 | C | 10 | " |
| 9 | 9.1 | 3.8 | C | 12.5 | " |

TABLE III-continued

Dopes of Poly(Terephthalic Hydrazide)

| | Polymer in Dope | | Aqueous | Solvent | |
|---|---|---|---|---|---|
| Item | Wt.% | ηinh | Solvent | Conc. Wt.% | Dope Type |
| 10 | 9.1 | 3.8 | D | 10 | '' |
| 11 | 4 | 4.5 | E | 5 | Isotropic |
| 12 | 4 | 4.5 | F | 5 | '' |
| 13 | 4 | 4.5 | F | 15 | '' |
| 14 | 4 | 4.5 | G | 15 | '' |
| 15 | 4 | 4.5 | H | 5 | '' |
| 16 | 4 | 4.5 | H | 15 | '' |
| 17 | 9.1 | 3.8 | I | 10 | '' |

EXAMPLE 13

This example illustrates preparation of poly(terephthalic/4,4-bibenzoic dihydrazide) (1/1) and an anisotropic dope thereof.

In a 100 ml. reactor blanketed with nitrogen and equipped with a mechanical stirrer are placed terephthalic dihydrazide (1.94 g., 0.01 mole) and 75 ml. of a solution of DMAc and NMP (300/75, V/V) containing 2.3% by weight lithium chloride. Stirring is continued for 10 minutes, after which 4,4'-bibenzoyl chloride (2.79 g., 0.01 mole) is added slowly. The reaction mixture is stirred for 1 hr., then combined with methanol in a blender to precipitate the product, which is collected, washed with methanol, and dried in a vacuum oven at 50°C.

A 20% solids dope of this polymer in 25% aqueous tetramethylammonium hydroxide is optically anisotropic.

EXAMPLE 14

This example illustrates the preparation of poly(2,5-dihydroterephthalic/terephthalic dihydrazide) (1/1) and an anisotropic dope thereof in tetramethylammonium hydroxide.

A solution of terephthalic dihydrazide (1.94 g., 0.01 mole) is prepared and stirred for 10 min. as in Example 14. 2,5-Dihydroterephthaloyl chloride (2.05 g., 0.01 mole) is added slowly over 20 min. Stirring is continued for 5 min., after which the reaction mixture is allowed to stand, under nitrogen, for 1 hr. It is then combined with water to precipitate the product which is collected, washed in a blender with water and with acetone, and dried in air; ηinh = 6.07 (Method 1) at 0.1% solids at 25°C.).

This polyhydrazide comprises repeating units of the structure

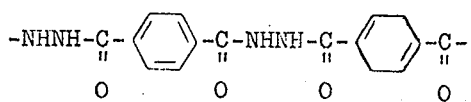

A 20% solids dope in 25% aqueous tetramethylammonium hydroxide is optically anisotropic, as is a 16.7% solids dope in a 16.7% aqueous solution of the same base.

What is claimed is:

1. A film and/or fiber forming solution comprising a (co)polyhydrazide in an aqueous solution of an organic base selected from the group consisting of tetramethylammonium hydroxide, and tetraethylammonium hydroxide, tetrapropylammonium hydroxide, and the (co)polyhydrazide being characterized by substantially equimolar amounts of repeating structural units of the formulae

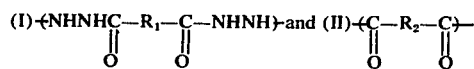

wherein $R_1$ and $R_2$ represent divalent radicals individually selected from the group of organic radicals of 1–12 carbon atoms, 2,5-pyridinediyl radicals, or a chemical bond.

2. The solution of claim 1 wherein the (co)polyhydrazide has an inherent viscosity of at least about 0.2.

3. A solution according to claim 2 comprising 5–35% (co)polyhydrazide in an aqueous solution of tetramethylammonium hydroxide at a base concentration of 2–30%.

4. A solution according to claim 3 containing from 5–28% of the (co)polyhydrazide, said solution being anisotropic.

5. A solution according to claim 2 comprising 5–10% (co)polyhydrazide in an aqueous solution of tetraethylammonium hydroxide at a base concentration of 2–10%.

6. A solution according to claim 4 wherein the polyhydrazide is poly(terephthalic hydrazide).

7. A film or fiber-forming solution of a (co)polyhydrazide in an aqueous solution of an organic base selected from the group consisting of tetramethylammonium hydroxide, tetraethylammonium hydroxide and tetrapropylammonium hydroxide, the (co)polyhydrazide being characterized by substantially equimolar amounts of repeating structural units of the formulae

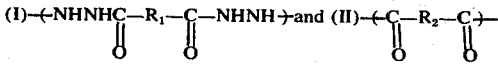

wherein $R_1$ and $R_2$ represent divalent radicals individually selected from the group of

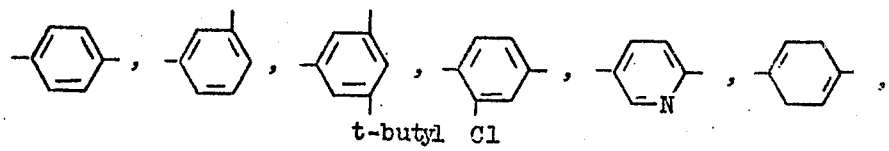

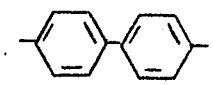 and a chemical bond.

8. A solution according to claim 7 wherein the formula (I) unit is
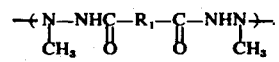
* * * * *